2,837,550

HYDROXYALKYLCYCLOPOLYSILOXANES

Maurice Prober, Schenectady, N. Y., assignor to General Electric Company, a corporation of New York No Drawing. Application May 18, 1955
Serial No. 509,413

1 Claim. (Cl. 260—448.2)

This invention relates to hydroxyalkylorganocyclopolysiloxanes. More particularly, this invention relates to hydroxyalkylheptamethyltetrasiloxanes having the formula:

(1)
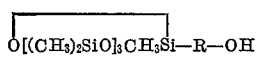
$$O[(CH_3)_2SiO]_3CH_3Si-R-OH$$

where R is a divalent lower aliphatic hydrocarbon radical such as, for example, the $-(CH_2)_n$ radical where $n$ is an integer equal to from 1 to 4 or more; and the

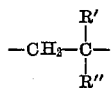

$$-CH_2-\underset{R''}{\overset{R'}{\underset{|}{C}}}-$$

radical where R' is a member selected from the class consisting of hydrogen and lower alkyl radicals having, for example, from 1 to 4 carbon atoms and R" is a lower alkyl radical.

Compounds within Formula 1 include those in which the R—OH radical attached to silicon may be either a primary, secondary or tertiary hydroxyalkyl radical including hydroxymethyl, β-hydroxyethyl, omega-hydroxypropyl, omega-hydroxybutyl, β-hydroxypropyl, β-hydroxybutyl, β-methyl-β-hydroxypropyl, β-butyl-β-hydroxypentyl, etc. radicals.

Although organosilicon compounds containing hydroxymethyl radicals attached directly to silicon are known in the art, there is no teaching in the art of cyclic organopolysiloxanes containing any type of hydroxyalkyl radical attached directly to silicon. The failure of the art to disclose these cyclic compounds is probably due to the methods commonly employed in preparing hydroxyalkylorganopolysiloxanes. In general, these compounds are prepared by chlorinating a methylsiloxane, acetylating this chloro derivative by reaction of the chloro derivative with potassium acetate in glacial acetic acid, and then hydrolyzing the acetoxy derivative with an alcohol such as methanol. When one attempts to acetylate chloromethylheptamethylcyclotetrasiloxane or other chloroalkylorganocyclopolysiloxanes in an attempt to prepare compounds within the scope of the present invention, it is found that the acetylating reagent employed, namely potassium acetate and glacial acetic acid, ruptures the silicon-oxygen linkages of the cyclic compound, resulting primarily in linear acetoxyalkylmethylpolysiloxanes.

I have now discovered methods for preparing the hydroxyalkylheptamethylcyclotetrasiloxanes and have also discovered that the products so-produced have unusual and unpredictable properties. For example, hydroxymethylheptamethylcyclotetrasiloxane has been found to be a very effective polymerization inhibitor for octamethylcyclotetrasiloxane. Thus, where the latter compound is to be employed, for example, as a hydraulic fluid or as a lubricant, in slightly alkaline surroundings, the incorporation of a minor amount of the hydroxymethylmethylcyclotetrasiloxane in the octamethylcyclotetrasiloxane will prevent the expected polymerization of the latter compound.

I have also found that β-hydroxyethylheptamethylcyclotetrasiloxane is a very effective cross-linking agent for octamethylcyclotetrasiloxane. Thus, when a minor amount of this compound is incorporated into octamethylcyclotetrasiloxane in the presence of a suitable organopolysiloxane polymerization catalyst such as potassium hydroxide, cesium hydroxide, anhydrous tetramethyl ammonium hydroxide, tetra-n-butyl phosphonium hydroxide, etc., the mixture will polymerize to form a firm, cross-linked organopolysiloxane gum. Thus gum is very valuable for applications such as in potting compounds, for filling voids in electrical apparatus and the like. I have also discovered that the incorporation of a minor amount of β-hydroxyethylheptamethylcyclotetrasiloxane into octamethylcyclotetrasiloxane allows the preparation of a cross-linked gum containing desirable fillers such as carbon black. It is noted that the usual polymerizable organopolysiloxanes may not be used in conjunction with carbon black fillers and the usual peroxide curing agents because of what appears to be some interaction between the carbon black and the peroxide which prevents the formation of firm cross-linked products.

I have also discovered that both hydroxymethylheptamethylcyclotetrasiloxane and β-hydroxyethylheptamethylcyclotetrasiloxane may be polymerized alone with the usual organopolysiloxane polymerization catalysts such as those described above to form organopolysiloxane gels. This result is unusual in view of the fact that cyclic dimethylsiloxanes when polymerized under these same conditions forms non-cross-linked linear or high molecular weight cyclic gums.

The hydroxymethylheptamethylcyclotetrasiloxane of the present invention may be prepared by forming the Grignard reagent of chloromethylheptamethylcyclotetrasiloxane, oxidizing the Grignard reagent by passing oxygen through the Grignard solution, and hydrolyzing the resulting oxidized Grignard reagent. The β-hydroxyethylheptamethylcyclotetrasiloxane may be prepared from the Grignard reagent of chloromethylheptamethylcyclotetrasiloxane by reacting formaldehyde with this reagent and hydrolyzing the resulting product. Other compounds within the scope of the present invention such as the omega-hydroxypropyl and the omega-hydroxybutyl compounds may be prepared by the same method used in preparing the β-hydroxyethyl compound except that an epoxide such as ethylene oxide or 1,2-propylene oxide is substituted for the formaldehyde. Compounds of the present invention in which the —OH group is attached to a secondary carbon atom are also prepared in the same way except that a higher aldehyde is substituted for the formaldehyde. Thus, the β-hydroxybutyl compound can be prepared by reacting propionaldehyde with the Grignard reagent of chloromethylheptamethylcyclotetrasiloxane. Compounds containing the —OH radical attached to a tertiary carbon atom can be found by reacting a ketone with the Grignard reagent of chloromethylheptamethylcyclotetrasiloxane. Thus the Grignard reagent of the latter compound may be reacted with ethyl propyl ketone to form β-ethyl-β-hydroxypentylheptamethylcyclotetrasiloxane.

The following examples, which are for purposes of illustration rather than for purposes of limitation, show in detail the preparation of compounds of the present invention and the use of the unexpected properties of these compounds to form polymerization inhibited octamethylcyclotetrasiloxane solutions and to form cross-linked organopolysiloxane gums.

Example 1

The Grignard reagent of chloromethylheptamethylcyclotetrasiloxane was prepared from 165.3 grams (0.5 mole) of the latter compound and 12.2 grams (0.5 mole) of magnesium in 500 ml. of ether. To this Grignard reagent was added about 0.5 mole of the Grignard reagent of isopropyl bromide, and dry oxygen was then bubbled through the reaction mixture. After standing for about twelve hours, the reaction mixture was hydrolyzed with cold 10 percent ammonium chloride solution containing a trace of sulfuric acid. This resulted in an aqueous phase and an ether phase the latter of which was dried over calcium chloride and simple distilled to remove most of the ether. The ether-free product was then rectified to yield hydroxymethylheptamethylcyclotetrasiloxane which boiled at 54.5 to 58° C. at about 0.5 mm. This compound had a melting point of 56 to 57° C. Chemical analysis of the product showed it to contain 30.6% carbon and 7.7% hydrogen. (Theoretical: 30.73% carbon and 7.74% hydrogen.)

Example 2

The Grignard reagent of chloromethylheptamethylcyclotetrasiloxane was prepared from 165.3 grams (0.5 mole) of the latter compound and 12.2 grams (0.5 mole) of magnesium in 700 ml. of ether. While this Grignard solution was stirred vigorously, formaldehyde prepared by the thermal decomposition of 35.0 grams of paraformaldehyde was added. After standing for about twelve hours the reaction mixture was poured into cold dilute sulfuric acid to yield an ether layer and an aqueous layer. The ether layer was separated, dried and distilled to remove most of the ether. The residue was rectified yielding β-hydroxyethylheptamethylcyclotetrasiloxane which boiled at 62.5° C. at 0.2 mm. Chemical analysis of this compound showed it to contain 33.2% carbon and 8.3% hydrogen. (Theoretical: 33.09% carbon and 8.02% hydrogen.)

Example 3

This example illustrates the inhibiting effect of hydroxymethylheptamethylcyclotetrasiloxane on the polymerization of octamethylcyclotetrasiloxane. A solution of 1 part by weight of the former compound in 9 parts by weight of the latter compound was heated to a temperature of about 80° C. At this time 0.05% by weight, based on the weight of the organopolysiloxanes, of anhydrous tetramethyl ammonium hydroxide was added to the solution. After being maintained at this temperature for about 24 hours no polymerization of the octamethylcyclotetrasiloxane had occurred. Under similar conditions, and in the absence of the hydroxymethylheptamethylcyclotetrasiloxane, octamethylcyclotetrasiloxane polymerizes to a gum having a viscosity in excess of a million centipoises.

Example 4

This example illustrates the effect of β-hydroxyethylheptamethylcyclotetrasiloxane as a cross-linking agent for octamethylcyclotetrasiloxane. A solution was prepared of 1 part by weight of the former compound in 9 parts by weight of the latter compound and was contacted with about 0.05% by weight, based on the weight of the siloxanes, of anhydrous tetramethyl ammonium hydroxide for about three hours at 85 to 90° C. This resulted in a cross-linked organopolysiloxane gum.

Example 5

This example illustrates the polymerization of β-hydroxyethylheptamethylcyclotetrasiloxane to a cross-linked gum. This cyclic compound was mixed with about 0.15% by weight of anhydrous tetramethyl ammonium hydroxide and maintained at a temperature of about 85–90° C. for about one hour. At the end of this time a highly cross-linked gum had been formed.

Example 6

This example illustrates the preparation of a silicone potting gel containing very small amounts of β-hydroxyethylheptamethylcyclotetrasiloxane. A solution of about 4 parts by weight of hydroxyethylheptamethylcyclotetrasiloxane and 1000 parts by weight of octamethylcyclotetrasiloxane were dried by being maintained under a high vacuum for about 10 minutes. At this time about 0.035 parts by weight of tetra-n-butyl phosphonium hydroxide (as a 15% solution of the hydroxide in octamethylcyclotetrasiloxane) were added to the solution. The solution was then heated at about 110° C. for about one-half hour to form a rubbery cross-linked organopolysiloxane gum. This gum was then heated at about 200° C. for one-half hour more to decompose the tetra-n-butyl phosphonium hydroxide.

Although the properties of the compounds of the present invention have been described primarily in connection with their use with octamethylcyclotetrasiloxane, it should be understood that these properties, namely the polymerization inhibiting property of the hydroxymethyl compound and the cross-linking property of the β-hydroxyethyl compound, can be used in conjunction with other cyclic dimethylsiloxanes such as the trimer, pentamer, hexamer, etc. of dimethylsiloxane and other diorganosiloxanes.

Although the utility of the compounds of the present invention has been described heretofore primarily in terms of their properties as applied to cyclic dimethylsiloxanes, it should be understood that these compounds may be used for many of the purposes for which other cyclic dimethylsiloxanes are adapted. Thus, the compounds may be employed as hydraulic fluids, lubricants, water-proofing agents, etc. In addition, it should be understood that the compounds may be employed alone or admixed to form high molecular weight, highly cross-linked organopolysiloxane gums. Thus, the hydroxymethylheptamethylcyclotetrasiloxane has been polymerized with catalysts such as anhydrous tetramethyl ammonium hydroxide, ferric chloride, and fuming sulfuric acid, at catalyst concentrations of from 0.05 to 0.5% by weight based on the weight of the organopolysiloxane at temperatures from room temperature up to 80° C. to form clear cross-linked organopolysiloxane gums. Similarly, the β-hydroxyethylheptamethylcyclotetrasiloxane may be polymerized with the same concentrations of these same catalysts at the same temperature to form clear, cross-linked organopolysiloxane gums.

What I claim as new and desire to secure by Letters Patent of the United States is:

β-Hydroxyethylheptamethylcyclotetrasiloxane.

References Cited in the file of this patent

UNITED STATES PATENTS 2,527,591  Speier _____ Oct. 31, 1950